March 4, 1947.  R. F. BRENNEN  2,416,735
STATOR WINDING DEVICE
Filed Oct. 30, 1944
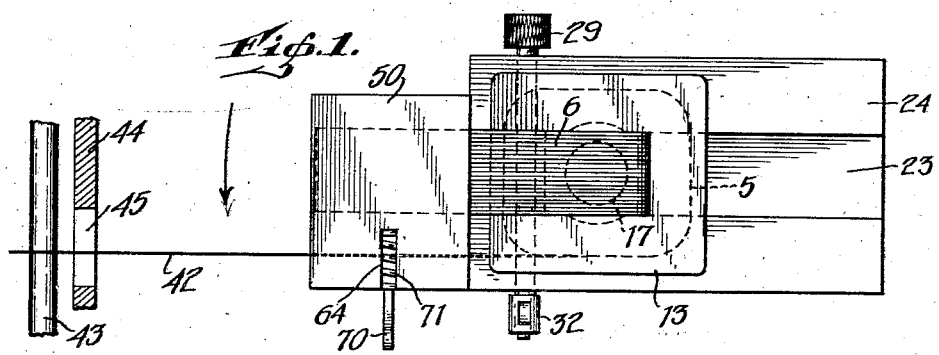
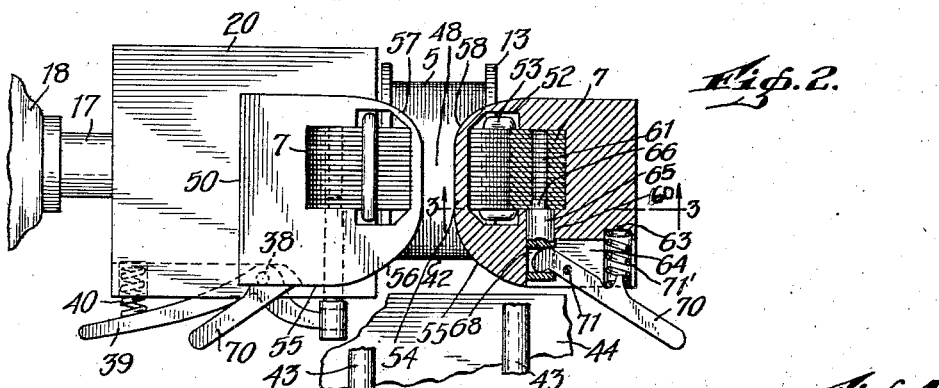
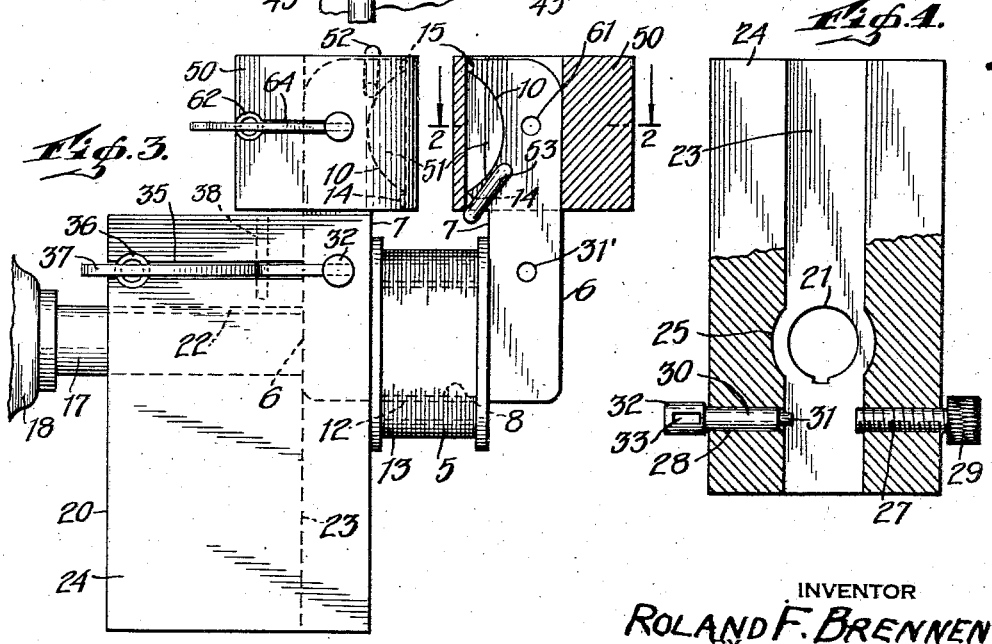
INVENTOR
ROLAND F. BRENNEN
BY
ATTORNEY Patented Mar. 4, 1947

2,416,735

UNITED STATES PATENT OFFICE 2,416,735

STATOR WINDING DEVICE

Ronald F. Brennen, Valley Stream, N. Y., assignor to General Die-Stamping-Tool Company, New York, N. Y., a partnership Application October 30, 1944, Serial No. 561,065

17 Claims. (Cl. 242—1)

This invention relates to winding and to means and methods for winding wire or similar strands about articles of special shape and more particularly to apparatus and devices for winding magnet coil wire around the yoke of non-concentric motor cores having projections which would interfere with the winding.

While the invention has broader application, it also relates specifically to a method and means to facilitate the winding of the field magnet coil on the stator-core of a bi-polar shaded pole motor of non-concentric design having parallel poles, and a yoke connecting the poles at one end of the motor said poles on the opposite end having opposed curved pole faces between which the rotor of the motor is to be disposed, said stator core being, while laminated in mechanical effect a one-piece stator with the poles permanently fixed on the yoke in parallel relation, the structures of the poles having end projections at the corners of the curved pole faces, on which the wire might be caught during winding.

Therefore, principal objects of the invention are to provide improved devices for guiding the wire through the narrow space between the curved pole faces and to prevent the wire from being caught on said projections.

The inventive feature for the accomplishment of these and other objects are shown herein, briefly stated, in connection with a stator core of a bi-polar motor having a yoke at one end and having ends having opposed faces having corner projections, the core being held by a rotary clamping block for rotating the core on the axis of the yoke. To prevent the wire being wound around the yoke from being caught on the corners of the pole faces, there are provided a pair of collar blocks, each having a longitudinal opening therethrough, adapted to slip and fit on the end of the pole and to cover all of said corners, each block being thin at the inner side and thick on the forward side, the faces of the said side merging to form cams over which the wire slides. Suitable means are provided for locking the core in the clamping block and for locking said collar blocks in place on the poles.

Other objects of the invention are to provide an improved means for holding the core while rotating, and means to hold the clamping-block and said collar-blocks in place.

Additional objects of the invention are to effect simplicity and efficiency in such means and to provide an extremely simple device or apparatus of this kind which is economical, convenient, speedy, durable and reliable in operation without skilled labor and is very economical to manufacture and convenient to install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

In the accompanying drawing showing, by way of example, one of many possible embodiments of the invention, Fig. 1 is a side elevation of the assembly of the stator and guiding means;

Fig. 2 is a fragmental front end elevation, partly in vertical section, the section being taken substantially on the line 2—2 of Fig. 3, looking in the direction of the arrows of said line;

Fig. 3 is a plan with the core rotated 180 degrees from the position of Fig. 2, Fig. 3 being partly in section substantially on the line 3—3 of Fig. 2, looking in the direction of the arrows of said line;

Fig. 4 is a side elevation of the clamping block, partly in longitudinal vertical section.

The stator core

While the present invention is adaptable of winding the coils of articles other than motors or electrical devices, the invention is here shown, by way of example, as adapted to facilitate the winding of the field magnet coil 5 on the stator core 6 (Fig. 3) of a bi-polar shaded pole motor of non-concentric design having parallel poles 7, and a yoke 8 connecting the poles at one end of the motor, said poles at the opposite end having opposed curved pole faces 10 between which the rotor of the motor is to be disposed. The illustrated stator core is made of a stack of flat one-piece identical laminations riveted together and each constituting a part of said yoke and poles whereby said stator is in mechanical effect a one-piece stator with the poles permanently fixed on the yoke in parallel relation, the stator core being provided with a plurality of holes therethrough perpendicular to the laminations and used for mounting the core and structure thereon and securing the laminations together.

An insulating sheet 12 and an insulating flange 13 form a spool around said yoke on which the wire of the magnet coil is to be wound. The structures of the poles having end projections 14, 15 at the corners of the curved pole faces 10, on which the wire might be caught during winding;

and means to prevent the wire from being thus caught will be described hereinafter.

Means for rotating the stator core

Any suitable means may be provided for rotating the stator core and spool thereon on the axis of the spool and yoke, for winding the wire on to the spool when the wire is suitably fed to the spool. The means here shown, by way of example, comprises a suitably mounted and driven horizontal rotary shaft 17 which may be the shaft of a motor 18, which shaft carries an elongated clamping block 20 having a bore 21 (Fig. 4) therethrough in which said shaft is keyed, as by the key 22, whereby the block is held fast on the end of the shaft, the block being provided with an elongated recess 23 transverse to the axis of the shaft and laterally open in a direction away from the shaft, in which one pole 6 of the motor core is adapted to longitudinally lie and fit, with the spool coaxial with the shaft and the poles extending radially from said axis in one direction, said block being elongated in the other direction, as at 24, to counterbalance the weight of the poles, to avoid vibration of the shaft.

The walls of the recess 23 are cut away as at 25 (Fig. 4) adjacent to the shaft to accommodate rivets in the stator which hold the laminations together.

Said block is provided with alined bores 27, 28 on opposite sides of said recess near the inner end of the block, said bore 27 being threaded and receiving a set-screw 29 adjustable to engage the side of the pole to accommodate poles of slightly different thickness.

Means for locking the stator core

Means are provided, by way of example, for quickly and efficiently locking the stator in the recess 23, said means including a pin 30 slidable in the bore 28 which is smooth. Said pin is provided with a reduced inner end 31 adapted to fit in a hole in the pole, the outer end of the pin having an exterior head 32 having a slot 33 therethrough. The block 20 has therein a transverse slot 35 (Fig. 3) parallel with and near the inner end thereof and radial to the pin 30 and provided at the end most remote from the pin with a large bore 36 perpendicular to the slotted face of the block and having a closed bottom. A lever 37 is intermediately pivoted in said slot on a pin 38 passing through the slot, the active end of the lever being loosely engaged in the slot 33 of the head 32, the other end forming an angularly projecting handle 39 (Fig. 2). A compression spring 40 compressed in said large bore 36 between its bottom and said handle yieldably holds said reduced end in the hole in the stator and locks the pole in place.

Preferably the stator rotates in the direction of the curved arrow of Fig. 1.

Means for guiding wire to the rotating core

Any suitable or well known mechanism automatic or otherwise may be provided for feeding and guiding the wire to the rotating coil, or the wire may be fed by hand; and herein I illustrate parts of structures for suitably limiting the guiding movements of the wire when feeding the wire 42 to the rotating coil. For limiting the guiding movement laterally I provide a pair of upright rods 43 (Figs. 1 and 2) mounted fast, on any suitable support, in spaced relation between which rods the wire passes from the hand, the rods limiting lateral guiding movement of the wire. A portion of a housing 44 or protective screen placed around and in front of the rotating stator is shown in Figs. 1 and 2. Such screen is provided with a horizontal window 45 at the space between the rods for limiting upward or downward movement of the wire as the wire is fed to the spool. Portions of the rod and screen shown in Fig. 1 are broken away in Fig. 2 to give view to other parts of the assembly. Obviously other suitable guide means may be used.

Wire guiding collar-blocks

The means to facilitate guiding the wire to the narrow space 48 (Figs. 2 and 3) and to prevent the wires from being caught on the corners 14, 15 of the curved pole face comprises a pair of substantially identical wire-guiding and positioning collar-blocks 50 alike at both ends, each having a longitudinal opening 51 therethrough, open at both ends and adapted to slip on the end of the pole and just long enough to cover all of said corners of the curved pole faces. Each opening 51 is formed to fit the outermost side face of the pole and adjacent portions of the adjacent faces, and to fit on said corners, the block being additionally cut away as at 52, to receive the shading coils 53 of the poles. Each block is thin at the side 54 adjacent to the space between the poles and thick at the side 55 toward the direction of rotation of the stator, the faces of the said adjacent and the front and rear sides being curved, as at 56 and 57, to merge into each other to form cam surfaces over which the wire slides as the stator rotates, whereby the wire may be guided by the surfaces into said space and past said corner projections out of contact therewith and as close as possible to the end flanges 13 of the spool.

Means for locking the collar block in place

Any suitable means may be provided for locking or holding said blocks in place, an example of which will now be described.

Each block is provided in the forward thick portion at the side 55 with a pin-receiving bore 60 alined with, and extending to, an adjacent hole 61 in the pole, and with a spring-receiving bore 62 having a closed bottom 63 spaced from the other bore, and a slot 64 connecting them. A lock-pin 65 slidable in the pin-receiving bore has a reduced inner end 66 engageable in said hole 61 of the pole. Said pin has a transverse slot 68 in the outer end in which is engaged the active end of a lever 70 intermediately fulcrumed in said slot 64 on a pivot pin 71 close to the lock pin remote from the spring receiving bore. A spring 71' compressed between said lever and said bottom 63 presses the pin tightly into locking engagement with the pole and in said hole 61.

The operation

The motor 18 is mounted fast on a suitable support, and while the motor is at rest, one pole of the stator core is inserted in the recess 23, as in Figs. 1 and 3, the locking pin 30 being first withdrawn, and then released to allow the reduced end 31 (Fig. 4) to enter one of the holes 31' (Fig. 3). If the stator-core is too thin to fill the recess, the screw 29 is adjusted to insure that the core shall not be too loose in the recess.

The wire 42 (Fig. 1) is pressed between the guide rods 43 and through the window 45 and anchored in the spool 12, 13 in the usual manner.

The assembly may then be rotated, the wire passing, relatively, through the space 48 (Fig. 2) with or without touching the faces 54, 56 as the case may be. As soon as the wire begins winding, it is moved evenly laterally back and forth from side to side from one rod 43 to the other, with the proper tension. To insure that the wire shall wind close to the flanges 13, the wire at a limit of lateral movement is held against the adjacent rod 43 with sufficient pressure and tension to cause the wire, after it has been cammed by the face 56 to the space 48, to snap under the inner projection 14 to a position close to the adjacent flange 13. In this manner, the wire may be wound substantially evenly and close to the flanges until the required amount is on the coil, after which the rotation is stopped, and the stator-core removed to make ready for the winding of another core.

The collar blocks may be placed on the pole ends to the position of Figs. 1 to 3, before or after the stator-core is clamped in place and before or after the wire is anchored to the spool. As both ends of the collar blocks are alike and because of the shape of the opening 51, the collar blocks cannot be put on in wrong position. The pin 65 is merely withdrawn by means of the lever 70 as the collar-block is put in place and allowed to snap into place with the reduced end 66 in the hole 61.

The invention claimed is:

1. Winding apparatus comprising means for rotating, on the axis of its yoke, a U-shaped stator having poles radial to the yoke having pole ends having projections thereon; and collars adapted to fit on said ends each having an opening adapted to receive the ends and projections, thereby to cover said projections; the side face of each collar adjacent to the other collar and adjacent side faces of such collar merging to form cams.

2. Apparatus to facilitate winding wire around the stator core yoke at one end of a U-shaped bi-polar motor; said apparatus comprising means for rotating the stator core on the axis of the yoke; a pair of collar-blocks each having an opening therethrough adapted to receive the end of the pole; the inner side face and an adjacent side face of each block merging to form a cam.

3. Apparatus to facilitate winding wire around the stator core yoke at one end of a U-shaped bi-polar motor having the pole ends having opposed faces having corner projections; said apparatus comprising means for rotating the stator core on the axis of the yoke; a pair of collar-blocks each having an opening therethrough adapted to receive the end of the pole and said faces and corners; the inner side face and adjacent side faces of each block merging to form cams over which the wires may slide and means for holding said collar blocks in place.

4. Apparatus to facilitate the winding of field magnet wire around the stator core yoke at one end of a bi-polar motor having pole ends having opposed faces having corner projections, said apparatus comprising means for rotating the stator core on the axis of the yoke; a pair of collar-blocks each having a longitudinal opening therethrough adapted to slip and fit on the end of the pole and to cover said corners; each block being thin at the inner side and thick at the forward side, the faces of the said sides merging to form cams over which the wire slides.

5. Apparatus as in claim 4, said block being provided in the forward thick portion with a pin receiving bore alined with, and extending to, an adjacent hole in the pole, and with a spring receiving bore having a closed bottom and spaced from the other bore and a slot connecting them; a pin across said slot near the pin receiving bore; a lock-pin in the pin-receiving bore having a reduced inner end engageable in a hole of the pole, and a transverse slot in the outer end; a lever intermediately fulcrumed in said slot on said pivot pin; and a spring compressed between said lever and said bottom for pressing the pin tightly into locking engagement with the pole.

6. An assembly to facilitate the winding of flexible strands around the yoke at one end of a U-shaped member having arms having inner projections near the other end, said assembly comprising means for rotating the member on the axis of the yoke; a pair of collar-blocks respectively having longitudinal openings therethrough adapted to slip and fit on the end of the arm and to cover all of said corners; each block being thin at the inner side and thick at the forward side, the faces of said side merging to form cams over which the wire slides; and means for holding the collar blocks in place; and guide means disposed a short distance from the stator for limiting lateral movement of the wire while guiding it to the rotating coil.

7. An assembly as in claim 6, said guide means comprising a pair of spaced upright members and structure forming a pair of closely spaced horizontal opposed faces, said means and structure forming a guide opening elongated in the direction of said axis and having the axis through the opening radial to said yoke.

8. Means to facilitate winding wire around the stator core yoke at one end of a bi-polar motor having the pole ends having opposed faces having corner projections, said means comprising means for rotating the stator core on the axis of the yoke; a pair of substantially identical wire guiding and positioning collar blocks alike at both ends, each having a longitudinal opening therethrough open at both ends, adapted to slip on the end of the pole and just long enough to cover all of said corners of the convexed pole faces; each opening being formed to fit the outermost side face of the pole and adjacent portions of the adjacent faces, and to fit on said corners, the block being additionally cut away to receive shading coils of the poles; said block being thin at the side adjacent to the space between the poles and thick at the side toward the direction of rotation of the stator, the faces of the said adjacent sides and the front and rear sides being curved to merge into each other to form cam surfaces over which the wire slides as the stator rotates, whereby the wire may be guided by the surfaces into said space and past said corner projections out of contact therewith and as close as possible to the end flanges of the spool; and means for holding said blocks in place.

9. Means to facilitate winding wire around the yoke of a U-shaped member, said means comprising a collar having an opening therethrough adapted to receive an end of the member, the inner side face and an adjacent side face of the block merging to form a cam.

10. Means to facilitate winding wire around the stator core yoke at one end of a bi-polar motor having the pole ends having opposed faces having corner projections, said means comprising a collar-block having an opening therethrough adapted to receive the end of the pole and said corners; the inner side face and adjacent side faces of the block merging to form cams.

11. A wire guiding and positioning collar block alike at both ends, and having a longitudinal opening therethrough open at both ends; said opening being rectangular in cross-section at opposite sides and adjacent to one of said opposite sides and cut away adjacent to the other opposite side; said block being thin at the side adjacent to the space between the cut-away parts and adjacent to one cut-away part the block being thick adjacent to the other cut-away part, the faces of the said sides adjacent to the cut-away parts and the space between being curved to merge into each other to form cam surfaces.

12. A block as in claim 11, said block being provided in the thick portion with a pin-receiving bore and extending to the opening, and with a spring receiving bore having a closed bottom and spaced from the other bore and a slot connecting them; a pivot pin disposed across said slot; a lock-pin in the pin-receiving bore having a reduced inner end engageable in said hole of the pole, and transverse slot in the outer end; a lever intermediately fulcrumed in said slot on said pivot pin; and a spring compressed between said lever and said bottom.

13. Apparatus to facilitate the winding of the field magnet coil on the U-shaped stator core of a bi-polar motor having parallel poles, and a yoke connecting the poles at one end of the motor; said poles being at the opposite end and having opposed curved pole faces; a spool around said yoke; means for rotating the stator core on the axis of the spool and yoke, said apparatus comprising a rotary shaft; a clamping block fast on the shaft and provided with an elongated recess transverse to the axis of the shaft, said recess being open at one end and having opposite side walls and a bottom and being laterally open in a direction away from said bottom whereby one pole of the motor core is adapted to longitudinally lie and fit in said recess, against two walls and the bottom, with the spool coaxial with the shaft; and means to hold the stator pole in said recess.

14. Apparatus as in claim 13, said block having on opposite sides of said recess bores alined with one opening of the pole near the inner end of the block; one of said bores being threaded and receiving a set-screw adjustable to engage the side of the pole to accommodate poles of slightly different thickness; the other bore being smooth and having a pin slidable therein and provided with a reduced inner end adapted to engage in said hole of the pole; the outer end of the pin having an exterior head having a slot therethrough; said block having therein a transverse slot in one face thereof parallel with and near the inner end thereof and radial to the pin and provided at the end most remote from the pin with a large bore perpendicular to the slotted face of the block; a lever intermediately pivoted in said slot on a pin passing through the slot; the active end of the lever being loosely engaged in the slot of the pin, the other end forming an angularly projecting handle; and a compression spring compressed in said large bore between its bottom and said handle, for holding said reduced end and said pole in place.

15. Apparatus as in claim 13 comprising means for guiding the wire to the rotating coil comprising a pair of upright rods mounted fast in spaced relation between which the wire passes from the hand; and a protective screen placed around and in front of the rotating stator and provided with a horizontal window at the space between the rods for limiting upward or downward movement of the wire as the wire is fed to the spool.

16. In combination, a horizontal rotary shaft; an elongated clamping block having a bore therethrough receiving said shaft whereby the block is held fast on the end of the shaft, the block being provided with an elongated recess transverse to the axis of the shaft and laterally open in a direction away from the shaft in which one pole of a U-shaped motor-core is adapted to longitudinally lie and fit with the yoke coaxial with the shaft and the poles extending radially from said axis in one direction; said block being elongated in the other direction to counterbalance the weight of the poles to avoid vibration of the shaft; the walls of the groove being cut away adjacent to the shaft to accommodate rivets in the stator; said block having on opposite sides of said recess bores alined with one opening of the pole near the inner end of the block; one of said bores being threaded and receiving a set-screw adjustable to engage the side of the pole to accommodate poles of slightly different thickness; the other bore being smooth and having a pin slidable therein and provided with a reduced inner end adapted to engage in a hole of the pole; and means for yieldably holding said pin in place.

17. Winding apparatus comprising means for rotating, on the axis of its yoke, a U-shaped stator having poles radial to the yoke and having pole ends; and a removable structure on each of said ends, each structure having a cam covering the inner side face of a pole end adjacent to the other pole end.

RONALD F. BRENNEN.

REFERENCES CITED

The following references are of record in the file of this patent:

UNITED STATES PATENTS

| Number | Name | Date |
| --- | --- | --- |
| 2,275,995 | Schneider | Mar. 10, 1942 |
| 1,371,647 | Sandell | Mar. 15, 1921 |
| 1,518,209 | McCord | Dec. 9, 1924 |